(12) United States Patent
Ikeda

(10) Patent No.: US 9,528,548 B2
(45) Date of Patent: Dec. 27, 2016

(54) CENTER BEARING SUPPORT

(71) Applicant: NOK CORPORATION, Tokyo (JP)

(72) Inventor: Masahiro Ikeda, Tottori (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/888,529

(22) PCT Filed: Apr. 22, 2014

(86) PCT No.: PCT/JP2014/061214
§ 371 (c)(1),
(2) Date: Nov. 2, 2015

(87) PCT Pub. No.: WO2014/181671
PCT Pub. Date: Nov. 13, 2014

(65) Prior Publication Data
US 2016/0084303 A1    Mar. 24, 2016

(30) Foreign Application Priority Data

May 8, 2013 (JP) ................................ 2013-098226

(51) Int. Cl.
*F16C 27/06* (2006.01)
*B60K 17/24* (2006.01)
*F16C 35/02* (2006.01)

(52) U.S. Cl.
CPC ............. *F16C 27/066* (2013.01); *B60K 17/24* (2013.01); *F16C 35/02* (2013.01)

(58) Field of Classification Search
CPC ............................... F16C 27/066; B60K 17/24
See application file for complete search history.

(56) References Cited

U.S. PATENT DOCUMENTS 3,743,365 A * 7/1973 Kato ..................... F16C 27/066
                                                                        384/536
5,033,875 A * 7/1991 Moulinet ............... B60K 17/24
                                                                        384/536
(Continued)

FOREIGN PATENT DOCUMENTS

JP        S58-169220 U      11/1983
JP        S63-289315 A      11/1988
(Continued)

*Primary Examiner* — Thomas R. Hannon
(74) *Attorney, Agent, or Firm* — Harness, Dickey & Pierce, P.L.C.

(57) ABSTRACT

In a center bearing support, a plurality of bored portions corresponding to spaces passing through a rubber-like elastic body in an axial direction are provided around a shaft hole. The bored portions are constructed by a combination of inner peripheral side bored portions arranged comparatively near the shaft hole, and outer peripheral side bored portions arranged comparatively far from the shaft hole. The inner peripheral side bored portions and the outer peripheral side bored portions are alternately provided circumferentially, and are provided so as to overlap in a part circumferentially, thereby having connection portions constructed by a part of the rubber-like elastic body between the inner peripheral side bored portions and the outer peripheral side bored portions. The connection portions are extended in a direction which is inclined to both of a circumferential direction and an axially perpendicular direction as seen from one side of the axial direction.

8 Claims, 11 Drawing Sheets

(56) References Cited

U.S. PATENT DOCUMENTS

| | | | | |
|---|---|---|---|---|
| 5,547,174 A | * | 8/1996 | Bade | F16C 27/066 |
| | | | | 267/154 |
| 5,829,892 A | * | 11/1998 | Groves | B60K 17/24 |
| | | | | 384/537 |
| 7,534,048 B2 | * | 5/2009 | Holman | F16C 23/06 |
| | | | | 384/535 |
| 2011/0243485 A1 | | 10/2011 | Kume et al. | |

FOREIGN PATENT DOCUMENTS

| | | |
|---|---|---|
| JP | H4-106016 U | 9/1992 |
| JP | H6-028343 U | 4/1994 |
| JP | 2008-281099 A | 11/2008 |
| JP | 2011-208785 A | 10/2011 |

* cited by examiner

PRIOR ART

PRIOR ART

PRIOR ART

CENTER BEARING SUPPORT

CROSS-REFERENCE TO RELATED APPLICATIONS

This application is a 371 U.S. National Stage Application of International Application No. PCT/JP2014/061214, filed on Apr. 22, 2014, and published in Japanese as WO 2014/181671 A1 on Nov. 13, 2014. This application claims priority to Japanese Application No. 2013-098226, filed on May 8, 2013. The entire disclosures of the above applications are incorporated herein by reference.

BACKGROUND OF THE INVENTION

Field of the Invention

The present invention relates to a center bearing support which supports in a vibration-proof manner a propeller shaft via a center bearing. The center bearing support according to the present invention is used for supporting in a vibration-proof manner a propeller shaft for a vehicle such as a motor vehicle, or is used for supporting in a vibration-proof manner the other propeller shaft or a propulsion shaft.

Description of the Conventional Art

Conventionally, as shown in FIG. 9, there has been known a block type center bearing support 51 which has a block-shaped rubber-like elastic body 52 having a shaft hole 53, and is structured such that a center bearing (not shown) is installed to an inner peripheral surface of the shaft hole 53, a propeller shaft (not shown) is inserted to the shaft hole 53, and the propeller shaft is supported in a vibration-proof manner via a center bearing.

The center bearing support 51 described-above is structured such as to adjust a spring constant corresponding to an elastic body by arranging a plurality of bored portions 54 serving as spaces passing through the rubber-like elastic body 52 in an axial direction around the shaft hole 53, however, has a worse following capability to an axial behavior of the propeller shaft in comparison with a bellows type center bearing support 61 having a bellows-shaped rubber-like elastic body 62 shown in FIG. 10, and is pointed out that the center bearing support 51 has a problem in a durability against a large displacement input.

SUMMARY OF THE INVENTION

Problem to be Solved by the Invention

The present invention is made by taking the above point into consideration, and an object of the present invention is to provide a center bearing support which is excellent in a following capability to an axial behavior of a propeller shaft in spite of a block type center bearing support having a block-shaped rubber-like elastic body, and can improve a durability against a large displacement input.

Means for Solving the Problem

In order to achieve the object mentioned above, a center bearing support according to the first aspect of the present invention is a center bearing support having a block-shaped rubber-like elastic body having a shaft hole, and structured such that a center bearing is installed to an inner peripheral surface of the shaft hole, a propeller shaft is inserted to the shaft hole, and the propeller shaft is supported in a vibration-proof manner via the center bearing, the center bearing support comprising a plurality of bored portions around the shaft hole, the bored portions corresponding to spaces passing through the rubber-like elastic body in an axial direction, wherein the bored portions are constructed by a combination of inner peripheral side bored portions which are provided comparatively near the shaft hole, and outer peripheral side bored portions which are provided comparatively far from the shaft hole, the inner peripheral side bored portions and the outer peripheral side bored portions are alternately provided circumferentially, and are provided so as to overlap in a part circumferentially, thereby having connection portions constructed by a part of the rubber-like elastic body between the inner peripheral side bored portions and the outer peripheral side bored portions, and the connection portions are extended in a direction which is inclined to both of a circumferential direction and an axially perpendicular direction as seen from one side of the axial direction.

Further, a center bearing support according to the second aspect of the present invention is the center bearing support described in the first aspect mentioned above, wherein the connection portions are formed into a linear shape or a curved shape having a predetermined width as seen from one side in the axial direction.

Further, a center bearing support according to the third aspect of the present invention is the center bearing support described in the first or second aspect mentioned above, wherein the connection portions which are adjacent to each other circumferentially are structured such that the directions of inclination are opposed to each other circumferentially.

Further, a center bearing support according to the fourth aspect of the present invention is the center bearing support described in the first, second or third aspect mentioned above, wherein the rubber-like elastic body has a concavity-like hollow shape in a portion facing to a chassis at the installing time.

In comparison with the prior art in FIG. 9, a comparative example is structured, as shown in FIG. 11, such that bored portions are constructed by a combination of inner peripheral side bored portions 55 which are provided comparatively near a shaft hole, and outer peripheral side bored portions 56 which are provided comparatively away from the shaft hole, and the inner peripheral side bored portions 55 and the outer peripheral side bored portions 56 are alternately provided circumferentially and are provided so as to overlap in a part circumferentially. According to the comparative example, since connection portions 57 constructed by a part of a rubber-like elastic body 52 is provided between the inner peripheral side bored portions 55 and the outer peripheral side bored portions 56, and the connection portions 57 have a capability which tends to elastically deform in an axial direction, it is possible to enhance the following capability to the axial behavior of the propeller shaft.

However, in the case that a circumferentially overlapping amount R is fixed, opening shapes of both the bored portions 55 and 56 are formed into a circular arc shape as shown, and the connection portions 57 are formed so as to extend in a circumferential direction, a length of the connection portions 57 can not be secured large. As a result, an amount of deformation in the axial direction is restricted.

Consequently, the present invention is structured such that the connection portions are formed so as to extend in the direction which is inclined to both of the circumferential direction and the axially perpendicular direction. The length of the connection portions can be secured larger in comparison with the comparative example by forming the connection portions so as to extend in a diagonal direction.

Therefore, according to the present invention, an excellent following capability to the axial behavior of the propeller shaft can be achieved.

The connection portions are formed into the linear shape having the predetermined width as seen from one side in the axial direction, however, may be formed into the curved shape having the predetermined width. In the case of the curved shape, the length of the connection portions can be secured further larger.

Further, the directions in which the connection portions are inclined may be set to be the same between the circumferentially adjacent connection portions. In this case, it is possible to set directionality that the circumferentially spring characteristic of the rubber-like elastic body is high (hard) in one side in the circumferential direction and is low (soft) in the other. On the contrary, it is possible to do away with the directionality in the circumferentially spring characteristic of the rubber-like elastic body, by setting the directions of inclination to the circumferentially opposite directions between the connection portions which are adjacent to each other circumferentially.

Further, it is generally desirable that the spring constant is low (a low spring is employed) in a support rigidity of the center bearing support when supporting the propeller shaft in a vibration-proof manner, however, there is a case that a certain degree of large support rigidity is necessary in view of a natural frequency in a spring-mass system in which the supported propeller shaft is set to a mass and the center bearing support is set to a spring, or in the case that a shared load is high (for example, the structure is used for a truck). In order to correspond to this, the spring constant can be set higher (a high spring can be achieved) by setting a spring component in a supporting direction (a vehicle lower direction) to a compression spring. However, since a reaction force starts up like a quadratic curve in the compression spring, the behavior of the propeller shaft is partly restricted, and there is a case that generation of vibration in an actual car presents problems.

Consequently, in order to correspond thereto, a concavity-like hollow shape is preferably provided in a portion which faces to the chassis in the rubber-like elastic body. Since a spring component in a supporting direction (a downward direction of the vehicle) is constructed by a combination of a shear spring and a compression spring (shear until the hollow shape collapses and compression after the collapse) in the case that that concavity-like hollow shape is provided as mentioned above, it is possible to reduce the start-up of the reaction force, and it is possible to suppress the generation of the vibration. Since the center bearing support according to the present invention is arranged above the chassis (installed to the upper surface of the chassis), the concavity-like hollow shape is provided in the lower surface portion of the center bearing support.

Effect of the Invention

The present invention achieves the following effect.

More specifically, since the length of the connection portion is set large as described above in the present invention, an excellent following capability to the axial behavior of the propeller shaft can be achieved, and it is possible to improve the durability of the rubber-like elastic body against the large displacement input. In the case that the connection portion is formed into the curved shape, the length of the connection portion can be set to be further large. In the case that the directions of incline are set to the opposite directions between the connection portions which are adjacent to each other circumferentially, it is possible to do away with the directionality about the spring characteristic in the circumferential direction. Further, since the spring component in the supporting direction is constructed by the combination of the shear spring and the compression spring by the provision of the concavity-like hollow shape in the portion facing to the chassis in the rubber-like elastic body, it is possible to reduce the start-up of the reaction force, and it is possible to suppress the generation of the vibration.

DETAILED DESCRIPTION OF PREFERRED EMBODIMENTS

The following embodiments are included in the present invention.

(1)

Figure 2:
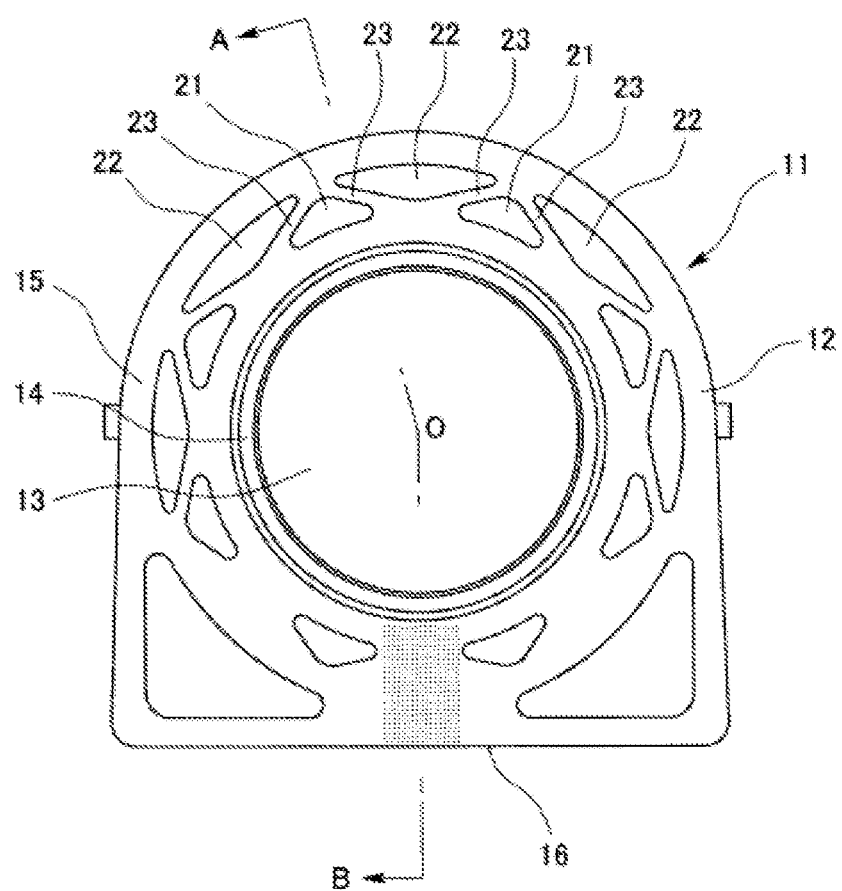
FIG. 2 is a front elevational view of the center bearing support.
Figure 4:
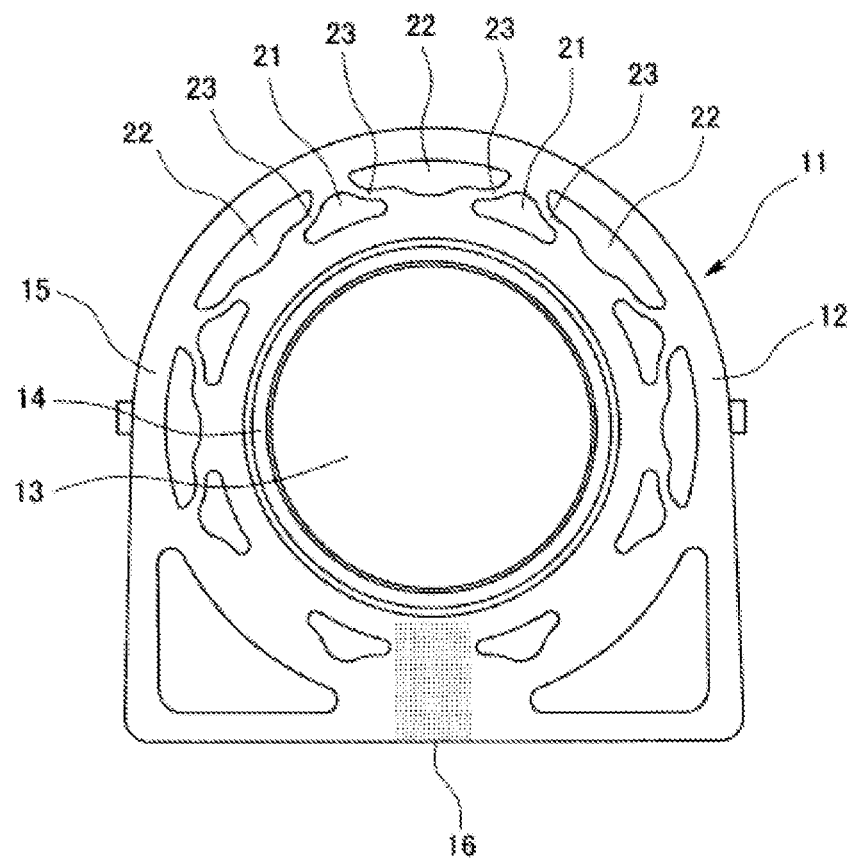
FIG. 4 is a front elevational view of a center bearing support according to a second embodiment of the present invention.

Structure (1-1) A bored part formed in an elastic body of a center bearing support supporting in a vibration-proof manner an intermediate bearing of a propeller shaft for a motor vehicle and the like, wherein the bored part has a shape in which approximately triangular shapes are faced (FIG. 2). The bored shape may be formed into a concavo-convex shape in the same manner (FIG. 4). The bored parts are desirably set to be arranged uniformly, however, may be arranged non-uniformly for adjusting the spring constant in each of the directions circumferentially.

(1-2) The length of the connection portion where the elastic body portion becomes thinner is secured by arranging the approximately triangular bored parts so as to face to each other as shown in FIG. 2. The combination of the concavo-convex shaped may be employed as shown in FIG. 4.

Figure 5:
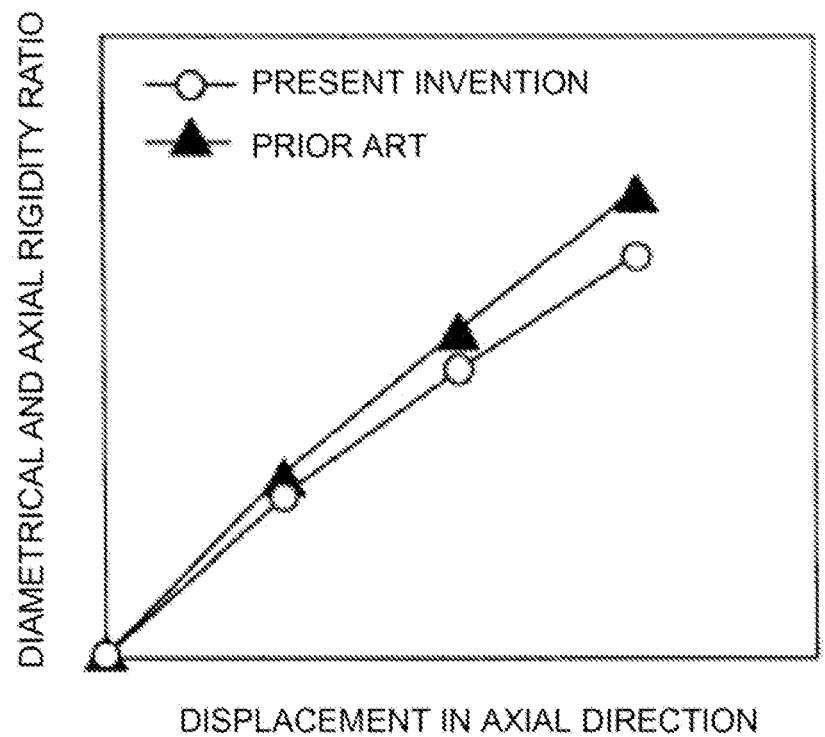
FIG. 5 is a graph showing a relationship between a displacement in an axial direction and a diametrical and axial rigidity ratio.

Effect (1-3) According to the structure mentioned above, it is possible to set the length of the connection portion which has a high load at the deforming time in the axial direction long, and it is possible to expect improvement of the durability. A rigidity ratio between the diametrical direction and the axial direction (a diametrical and axial rigidity ratio) under the same supporting rigidity (a diametrical spring constant) comes to that shown in FIG. 5.

Figure 6:
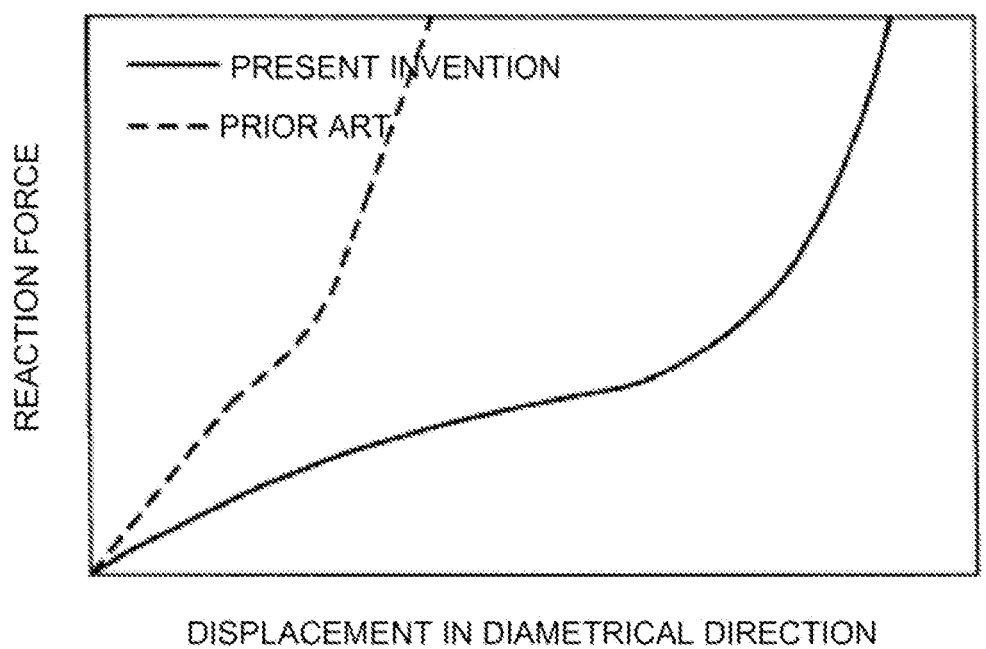
FIG. 6 is a graph showing a relation between a displacement in a diametrical direction and a reaction force.

(1-4) Since a clearance in the circumferential direction can be secured in the approximately triangular shape, the low support spring can be secured with a long stroke even when a previous compression is applied. FIG. 6 shows a reaction force in relation to a displacement in a diametrical direction.

(2)

Structure (2-1) An elastic body of a center bearing support supporting in a vibration-proof manner an intermediate bearing of a propeller shaft for a motor vehicle and the like, wherein a spring component in a vehicle downward direction is set to combination of compression and shear by the provision of a cut-out approximately formed into an inverted-U shape in the vehicle downward direction.

(2-2) A chassis side coming to the other part may be formed into a shape which is along the cut-out mentioned above.

(2-3) The spring component in the vehicle downward direction is set to the combination of compression and shear by the provision of the cut-out approximately formed in the inverted-U shape in relation to the chassis in the vehicle downward direction.

Effect (2-4) It is possible to secure a space in which the propeller shaft can behave (stroke) while maintaining a high supporting rigidity on the basis of the structure mentioned above.

(2-5) A width of a characteristic tuning according to a shape becomes wide in addition to an adjustment by an elastic modulus (for example, a rubber hardness) in the elastic body by changing a rate of the compression and shear spring on the basis of the shape of the bored part and the cut-out portion, and it is possible to enhance a degree of freedom in design. Further, it is possible to adjust an amount of stroke without changing the support rigidity on the basis of a depth (a height) of the cut-out portion.

(2-6) It is possible to reproduce the characteristic obtained by the conventional compression spring by forming the chassis side into a shape which is along the cut-out. For example, it is possible to follow to demand on a support rigidity difference to the center bearing support according to the vehicle characteristic by one specification and it is possible to integrate the product specification.

EMBODIMENTS

Next, a description will be given of embodiments according to the present invention with reference to the accompanying drawings.

First Embodiment

Figure 1:
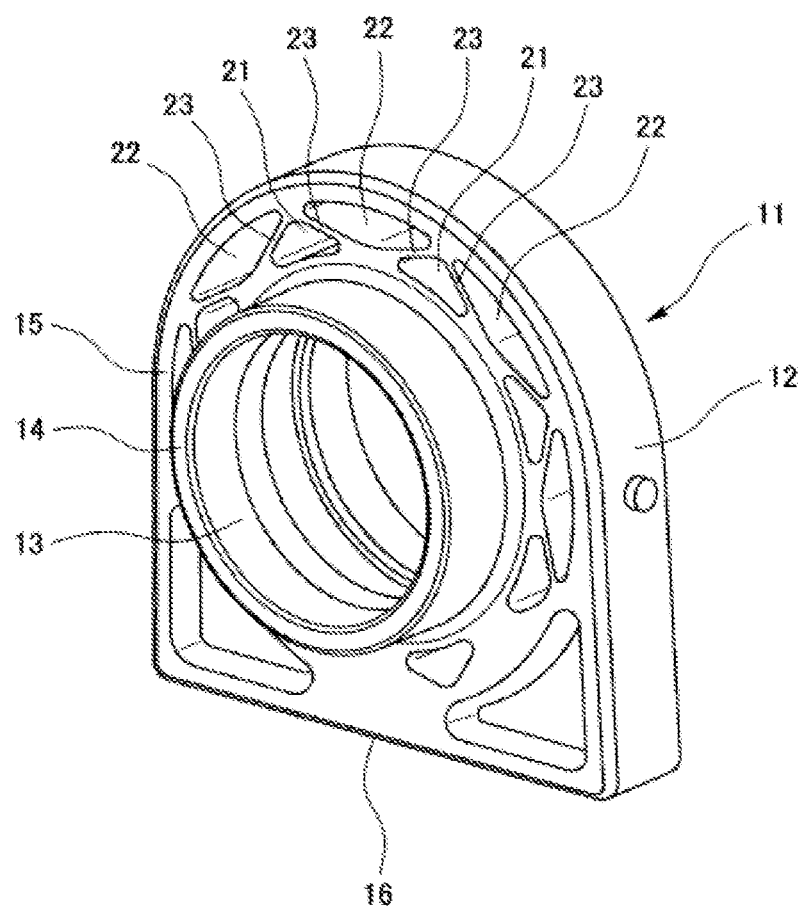
FIG. 1 is a perspective view of a center bearing support according to a first embodiment of the present invention.
Figure 3:
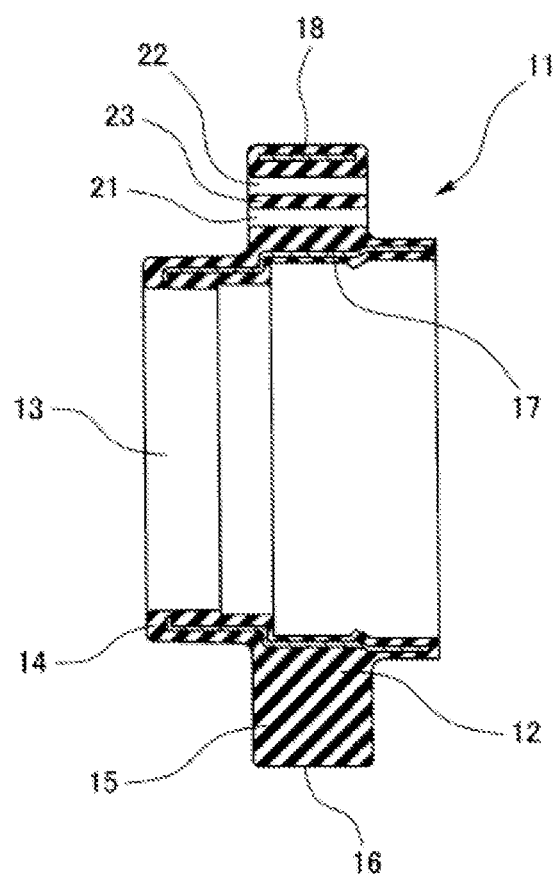
FIG. 3 is a cross-sectional view of the center bearing support and is a cross-sectional view along a line A-O-B in FIG. 2.

FIGS. 1 to 3 show a center bearing support 11 according to a first embodiment of the present invention. The center bearing support 11 according to the embodiment is structured such as to elastically support in a vibration-proof manner a propeller shaft (a propulsion shaft (not shown)) via a center bearing (an intermediate bearing (not shown)) in a vehicle such as a motor vehicle, and is structured as follows.

More specifically, the center bearing support 11 has a rubber-like elastic body (an elastic body) 12 which is formed into a block shape, and is provided with a shaft hole 13 in a center portion of a front surface of the rubber-like elastic body. Further, the rubber-like elastic body 12 integrally has a cylindrical shaft insertion portion 14 which is provided around the shaft hole 13, and a vibration-proof supporting portion 15 which is provided in an outer peripheral side of the shaft insertion portion 14, and is formed into a block type center bearing support as a whole since the latter vibration-proof supporting portion 15 is formed into a block shape approximately having a rectangular cross section as shown by a cross section in FIG. 3. As shown in FIG. 2, the vibration-proof supporting portion 15 is formed into an approximately inverted-U shaped front elevational shape which is formed into a concentric circle with the shaft hole 13 in an upper side and is formed into a square shape in a lower side, as seen from one side (a front elevational direction) in an axial direction, and is installed to a chassis (not shown) by putting a bracket (not shown) having an approximately inverted-U shape in a front elevational shape from the above and fixing the bracket to the chassis in a state in which a flat lower surface portion 16 is faced to and brought into contact with an upper surface portion of the chassis. Further, as shown in FIG. 3, an inner peripheral side reinforcing member 17 formed into an annular shape is buried in the shaft insertion portion 14, and an outer peripheral side reinforcing member 18 formed into an approximately inverted-U shape in a front elevational view is buried in an outer peripheral portion of the vibration-proof supporting portion 15. According to the structure mentioned above, the center bearing support 11 has the block-shaped rubber-like elastic body 12 which is provided with the shaft hole 13, and is structured such that the center bearing is installed to the inner peripheral surface of the shaft hole 13, the propeller shaft is inserted to the shaft hole 13, and the propeller shaft is supported in a vibration-proof manner via the center bearing.

A plurality of bored portions 21 and 22 serving as spaces which pass through the rubber-like elastic body 12 in an axial direction are provided around the shaft hole 13 and the shaft insertion portion 14 in the rubber-like elastic body 12. More specifically, the bored portions 21 and 22 are provided in the elastic supporting portion 15 around the shaft hole 13 and the shaft insertion portion 14 in the rubber-like elastic body 12 so as to pass through the elastic supporting portion 15 in its thickness direction, and are constructed by a combination of inner peripheral side bored portions 21 which are provided comparatively near the shaft hole 13, and outer peripheral side bored portions 22 which are provided comparatively away from the shaft hole 13.

The inner peripheral side bored portions 21 are uniformly provided at a plurality of positions (eight positions in the drawing) around the shaft hole 13 and the shaft insertion portion 14. An opening shape of the inner peripheral side bored portion 21 is formed into an approximately isosceles triangular shape in which an apex angle is directed outward in a diametrical direction.

On the other hand, the outer peripheral side bored portions 22 are provided at a plurality of positions (five positions in the drawing) from a nine o'clock position to a three o'clock position in a clockwise direction in the case that the front surface of the rubber-like elastic body 12 is assumed as a hour place of the clock (positioned in an upper circle in the approximately inverted-U shape) so as to be spaced at fixed intervals in a circumferential direction. An opening shape of the outer peripheral side bored portion 22 is formed into an approximately isosceles triangular shape in which an apex angle is directed inward in the diametrical direction, or is formed into an approximately fan shape since a bottom side portion thereof is formed into a circular arc shape.

The inner peripheral side bored portions 21 and the outer peripheral side bored portions 22 are alternately provided circumferentially, are provided so as to partly overlap circumferentially, and are provided so as to partly overlap in a diametrical direction. Accordingly, connection portions 23 constructed by a part of the rubber-like elastic body 12 are provided between the inner peripheral side bored portions 21 and the outer peripheral side bored portions 22 which are adjacent to each other.

The connection portions 23 are extended in a direction which is inclined to both of a circumferential direction and an axially perpendicular direction as seen from one side in an axial direction, that is, are provided toward a diagonal direction which is neither the circumferential direction nor the diametrical direction.

Further, the connection portions 23 are formed into a linear shape having a predetermined width as seen from one side in the axial direction.

Further, the connection portions 23 which are adjacent to each other circumferentially are structured such that directions of incline are opposed to each other circumferentially. In other words, five odd number of connection portions 23 from the left among ten connection portions 23 drawn in FIG. 2 are arranged at positions where their outer peripheral end portions are displaced in a counterclockwise direction (one side of the circumferential direction) in comparison with their inner peripheral end portions. As a result, these five connection portions 23 are inclined in the counterclockwise direction. On the contrary, five even number of connection portions 23 from the left are arranged at positions where their outer peripheral end portions are displaced in a clockwise direction (the other side of the circumferential direction) in comparison with their inner peripheral end portions. As a result, these five connection portions 23 are inclined in the clockwise direction. Therefore, the connection portions 23 which are inclined in the counterclockwise direction and the connection portions 23 which are inclined in the clockwise direction are alternately provided circumferentially.

Figure 11:
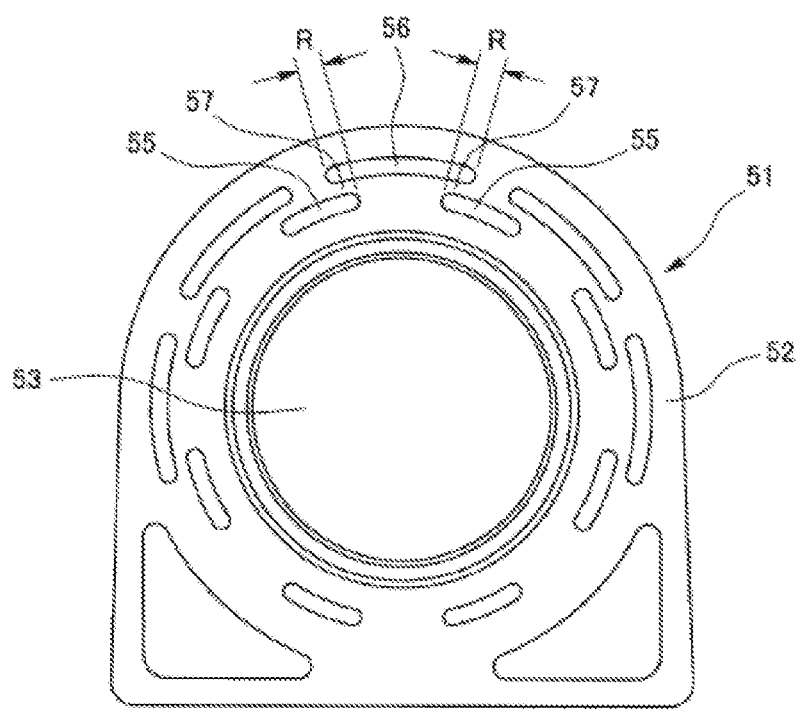
FIG. 11 is a front elevational view of a center bearing support according to a comparative example.

In the center bearing support 11 having the structure mentioned above, since the connection portions 23 are extended toward the diagonal direction and their lengths are set to be larger in comparison with the comparative example in FIG. 11, an excellent following capability to the axial behavior of the propeller shaft can be achieved. Therefore, it is possible to improve a durability of the rubber-like elastic body 12 in relation to the large displacement input in the axial direction. Further, since the directions of incline are set to be opposite to each other circumferentially between the connection portions 23 which are adjacent to each other circumferentially, it is possible to do away with the directionality about the spring characteristic in the circumferential direction. In this connection, the center bearing support 11 according to the embodiment is constructed as a molded product having a symmetrical shape as shown in FIG. 2.

Second Embodiment

In the first embodiment mentioned above, the connection portions 23 are formed into the linear shape having the predetermined width as seen from one side in the axial direction, however, the connection portion 23 may be alternatively formed into a curved shape having a predetermined width as seen from one side in the axial direction.

FIG. 4 shows an embodiment according to the embodiment, and the connection portions 23 are formed into a curved shape as shown. It is achieved on the assumption that concave circular arc surfaces are formed in portions facing to the outer peripheral side bored portions 22, in the inner peripheral side bored portions 21, and convex circular arc surfaces are formed in portions facing to the inner peripheral side bored portions 21, in the outer peripheral side bored portions 22. According to the structure mentioned above, the length of the connection portions 23 can be set further larger in comparison with that of the first embodiment.

Third Embodiment

In the first and second embodiments, the lower surface portion 16 of the rubber-like elastic body 12 facing to the chassis at the installing time is formed into the flat surface shape. However, since the lower surface portion 16 comes into contact with the chassis in its whole surface in the case that the lower surface portion 16 is formed into the flat surface shape as mentioned above, the spring component of the rubber-like elastic body 12 is constructed only by the compression spring at a position just below the shaft hole 13 and the shaft insertion portion 14 (a dotted position in FIG. 2 or 4) in the rubber-like elastic body 12 when the load or the vibration of the propeller shaft is applied to the lower portion 16. However, since the reaction force of the compression spring starts up largely like a two-dimensional curve as described above (a line of the comparative example in FIG. 8), the behavior of the propeller shaft is partly restricted, and there is a case that the generation of the vibration in the actual car presents problems.

Figure 7:
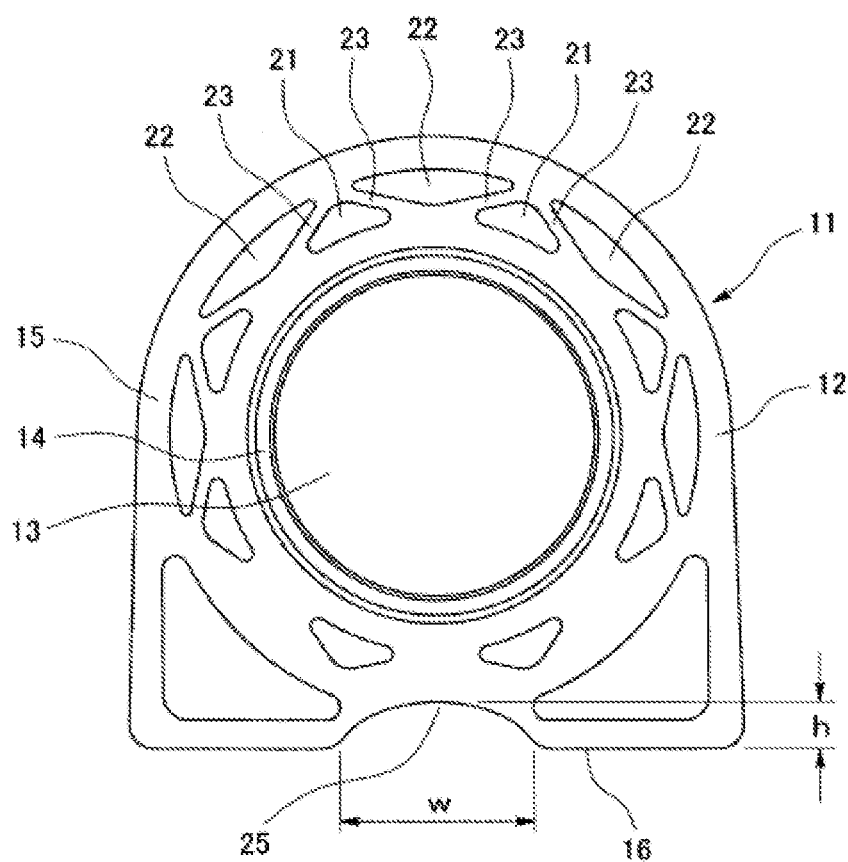
FIG. 7 is a front elevational view of a center bearing support according to a third embodiment of the present invention.

In order to correspond to the problem, a concavity-like hollow shape 25 is provided in the center portion in the width direction of the lower surface portion 16 which is the portion facing to the chassis in the rubber-like elastic body 12, as shown in FIG. 7 in the third embodiment. In the case that the concavity-like hollow shape 25 is provided as mentioned above, the spring component of the rubber-like elastic body 12 above the hollow shape 25 is constructed by a combination of the shear spring and the compression spring (the shear spring until the hollow shape 25 collapses, and the compression spring after the collapse). Therefore, it is possible to reduce the start-up of the reaction force (a line of the present invention in FIG. 8), and it is possible to suppress the generation of the vibration.

Figure 8:
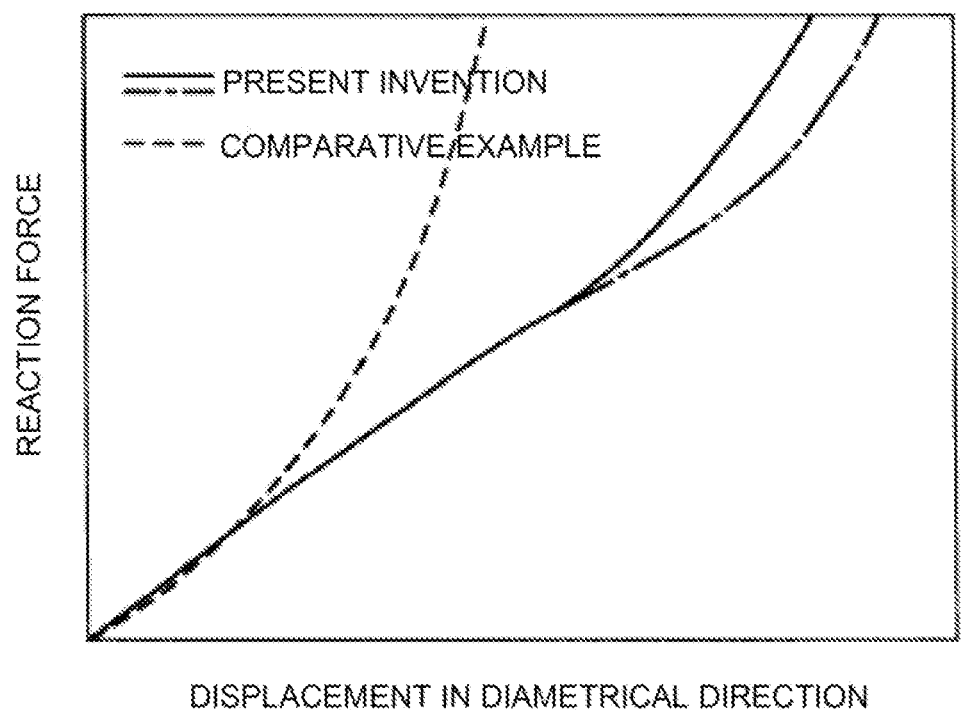
FIG. 8 is a graph showing a relationship between the displacement in the diametrical direction and the reaction force.
Figure 9:
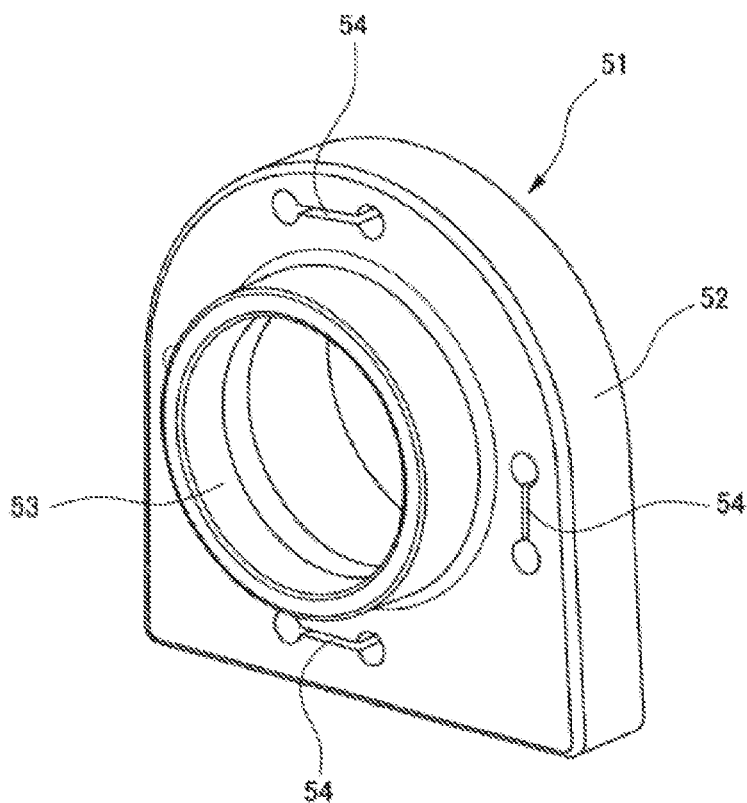
FIG. 9 is a perspective view of a center bearing support according to a prior art.
Figure 10:
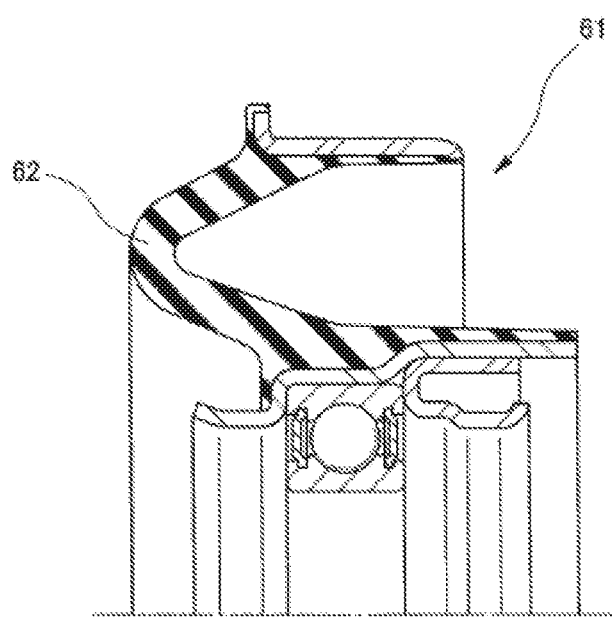
FIG. 10 is a cross-sectional view of a center bearing support according to the other prior art.

The hollow shape 25 is formed into a circular arc shape or an approximately inverted-U shape as seen from one side in the axial direction. Further, the hollow shape 25 can adjust the spring characteristic thereof by appropriately changing a height h and a width w thereof (the specification indicated by a one-dot chain line in FIG. 8 shows a case obtained by enlarging the height h in relation to the specification indicated by a solid line).

What is claimed is:

1. A center bearing support having a block-shaped rubber-like elastic body having a shaft hole, and structured such that a center bearing is installed to an inner peripheral surface of said shaft hole, a propeller shaft is inserted to said shaft hole, and said propeller shaft is supported in a vibration-proof manner via said center bearing, the center bearing support comprising a plurality of bored portions around said shaft hole, the bored portions corresponding to spaces passing through said rubber-like elastic body in an axial direction, wherein said bored portions are constructed by a combination of inner peripheral side bored portions which are provided comparatively near said shaft hole, and outer peripheral side bored portions which are provided comparatively far from said shaft hole, wherein said inner peripheral side bored portions and the outer peripheral side bored portions are alternately provided circumferentially, and are provided so as to overlap in a part circumferentially, thereby having connection portions constructed by a part of said rubber-like elastic body between said inner peripheral side bored portions and the outer peripheral side bored portions, wherein a number of inner peripheral side bored portion is greater than a number of outer peripheral side bored portions, and wherein said connection portions are extended in a direction which is inclined to both of a circumferential direction and an axially perpendicular direction as seen from one side of the axial direction.

2. The center bearing support according to claim 1, wherein said rubber-like elastic body has a concavity-like hollow shape in a portion facing to a chassis at the installing time.

3. The center bearing support according to claim 1, wherein said connection portions which are adjacent to each other circumferentially are structured such that said directions of inclination are opposed to each other circumferentially.

4. The center bearing support according to claim 3, wherein said rubber-like elastic body has a concavity-like hollow shape in a portion facing to a chassis at the installing time.

5. The center bearing support according to claim 1, wherein said connection portions are formed into a linear shape or a curved shape having a predetermined width as seen from one side in the axial direction.

6. The center bearing support according to claim 5, wherein said rubber-like elastic body has a concavity-like hollow shape in a portion facing to a chassis at the installing time.

7. The center bearing support according to claim 5, wherein said connection portions which are adjacent to each other circumferentially are structured such that said directions of inclination are opposed to each other circumferentially.

8. The center bearing support according to claim 7, wherein said rubber-like elastic body has a concavity-like hollow shape in a portion facing to a chassis at the installing time.

* * * * *